P. MARCELLOT.
CHANGE SPEED GEARING.
APPLICATION FILED NOV. 14, 1912.

1,195,831. Patented Aug. 22, 1916.
7 SHEETS—SHEET 1.

WITNESSES

INVENTOR
PIERRE MARCELLOT.
BY
ATTORNEYS

P. MARCELLOT.
CHANGE SPEED GEARING.
APPLICATION FILED NOV. 14, 1912.

1,195,831.

Patented Aug. 22, 1916.
7 SHEETS—SHEET 2.

WITNESSES

INVENTOR
PIERRE MARCELLOT,
BY
ATTORNEYS

P. MARCELLOT.
CHANGE SPEED GEARING.
APPLICATION FILED NOV. 14, 1912.

1,195,831.

Patented Aug. 22, 1916.
7 SHEETS—SHEET 3.

WITNESSES

INVENTOR
PIERRE MARCELLOT
BY
ATTORNEYS

P. MARCELLOT.
CHANGE SPEED GEARING.
APPLICATION FILED NOV. 14, 1912.
1,195,831.
Patented Aug. 22, 1916.
7 SHEETS—SHEET 4.
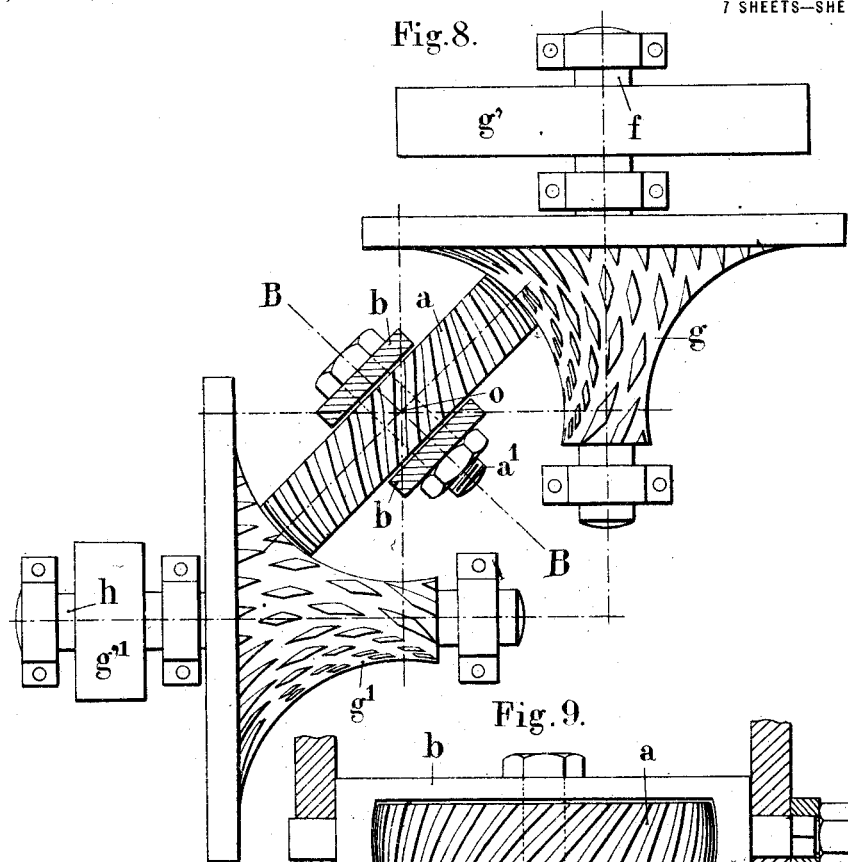
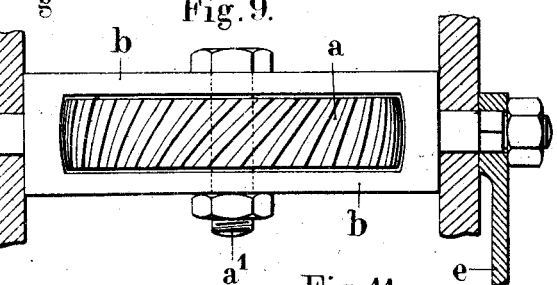
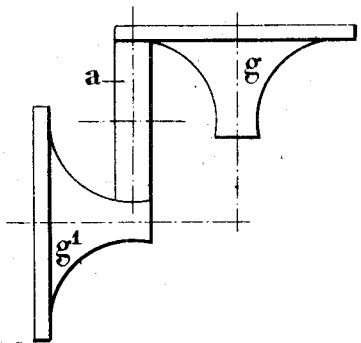 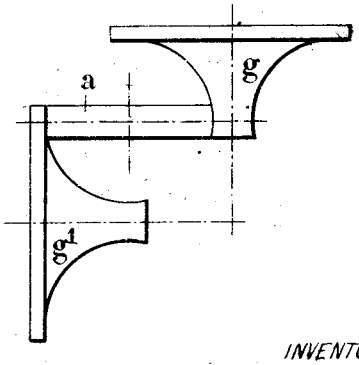
WITNESSES
INVENTOR
PIERRE MARCELLOT
ATTORNEYS

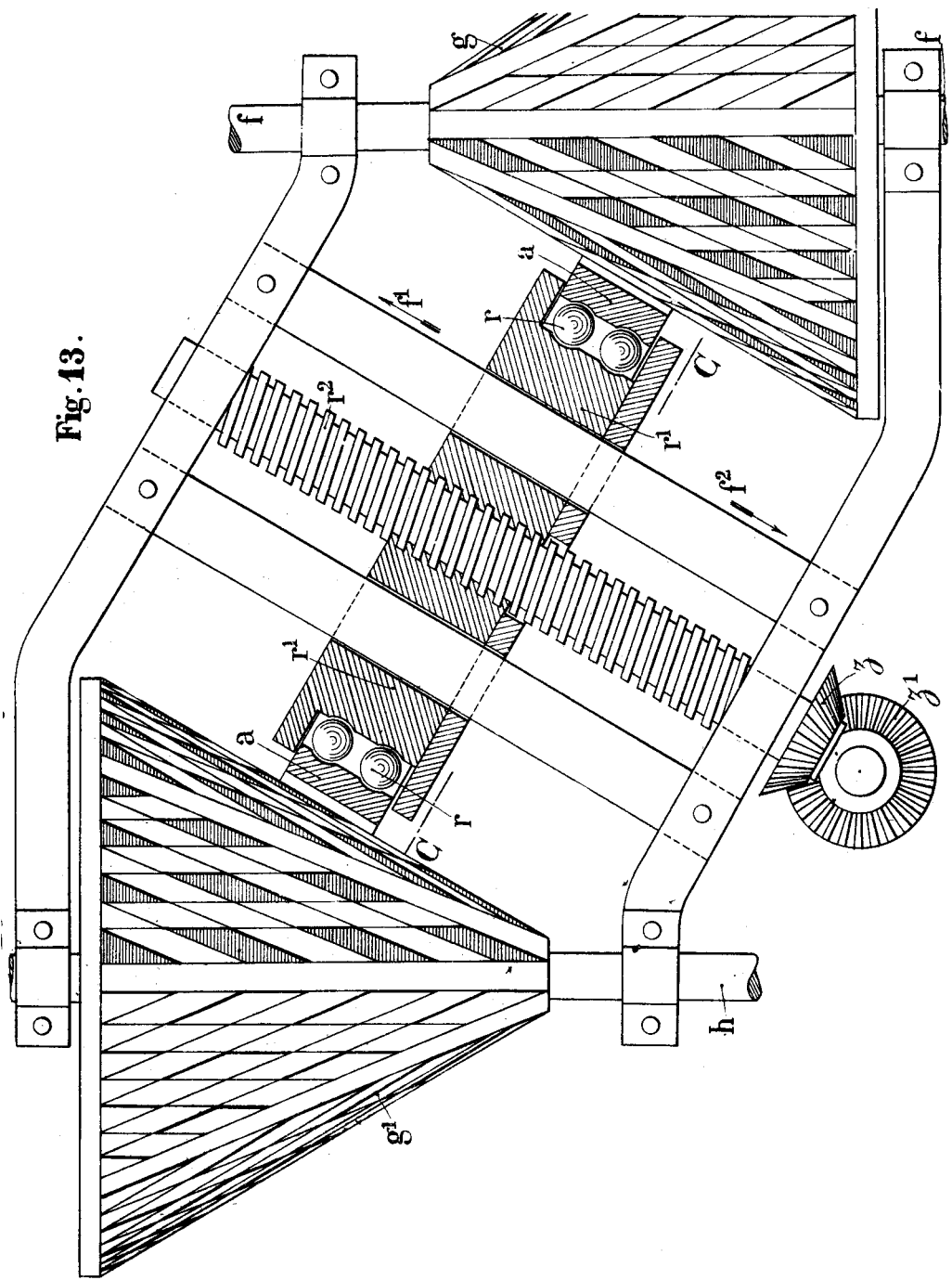

P. MARCELLOT.
CHANGE SPEED GEARING.
APPLICATION FILED NOV. 14, 1912.

1,195,831.

Patented Aug. 22, 1916.
7 SHEETS—SHEET 7.

WITNESSES

INVENTOR
PIERRE MARCELLOT
BY
ATTORNEYS

UNITED STATES PATENT OFFICE.

PIERRE MARCELLOT, OF PARIS, FRANCE.

CHANGE-SPEED GEARING.

1,195,831.   Specification of Letters Patent.   Patented Aug. 22, 1916.

Application filed November 14, 1912. Serial No. 731,374.

*To all whom it may concern:*

Be it known that I, PIERRE MARCELLOT, of 60 Rue des Marais, in the city of Paris, Republic of France, engineer, have invented a Change-Speed Gearing, of which the following is a full, clear, and exact description.

The invention relates to a change speed gear allowing to obtain a variation of the speed from the minimum speed up to the maximum speed.

This change speed gearing is essentially characterized by a toothed pinion having either the shape of a solid of revolution, or being conical or plane, this pinion being provided with teeth the number of which decreases from the part of the pinion farthest from the axis of rotation to the part nearest to said axis. This pinion gears with a second toothed pinion, that may be moved relatively to the first, so as to bring it in gear with a region of the first pinion provided with a greater or less number of teeth, thus modifying the speed.

The invention is further characterized by the method of forming the teeth of the first pinion. These teeth have the shape of lozenges limited by two series of parallel ways serving as passages for the teeth of the second pinion. By means of this arrangement, the position of the movable pinion may be modified at any moment during the operation of the change speed gearing.

Finally the invention is characterized by a combination of two pinions, having a variable number of teeth, as above set forth, with a pinion simultaneously gearing with the two preceding ones; this latter pinion is capable of being moved relatively to the first pinions for changing the speed.

Figure 1:
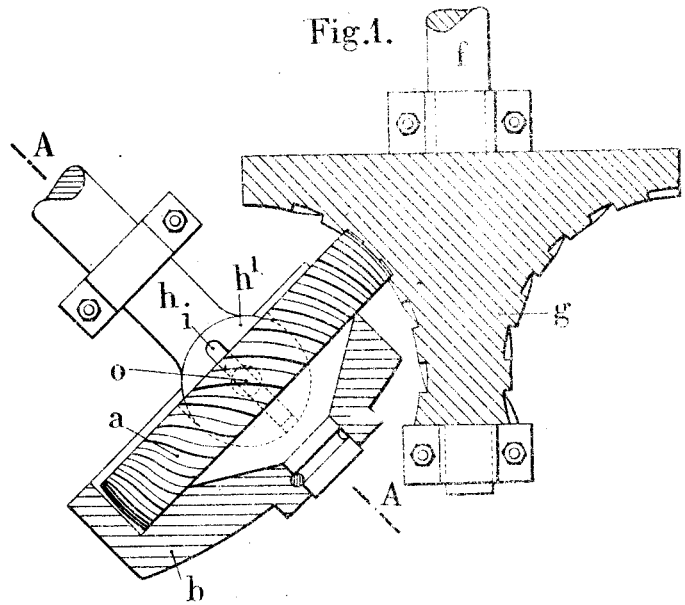
Figure 2:
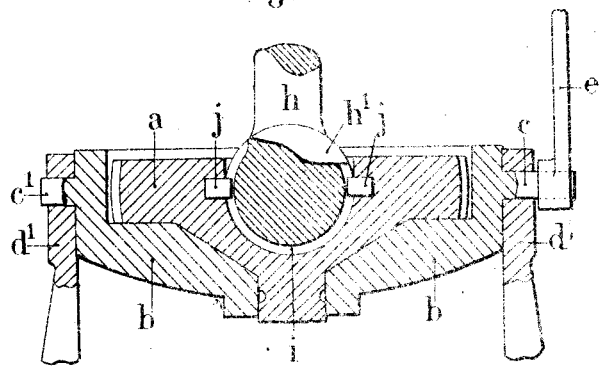
Figure 3:
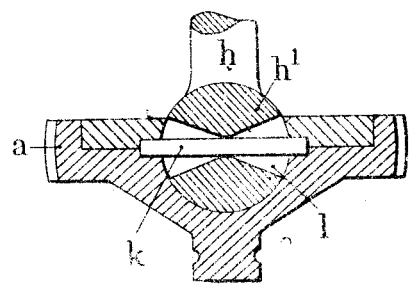
Figure 4:
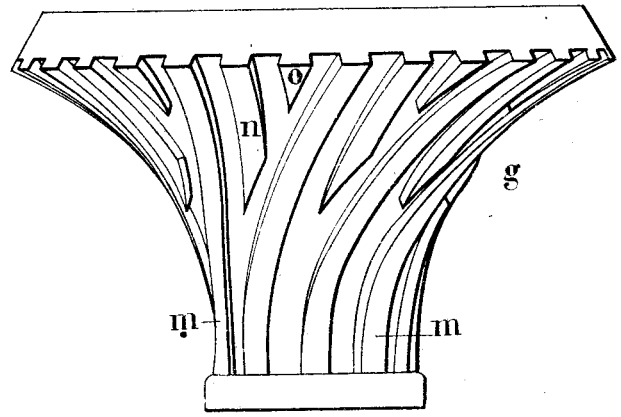
Figure 5:
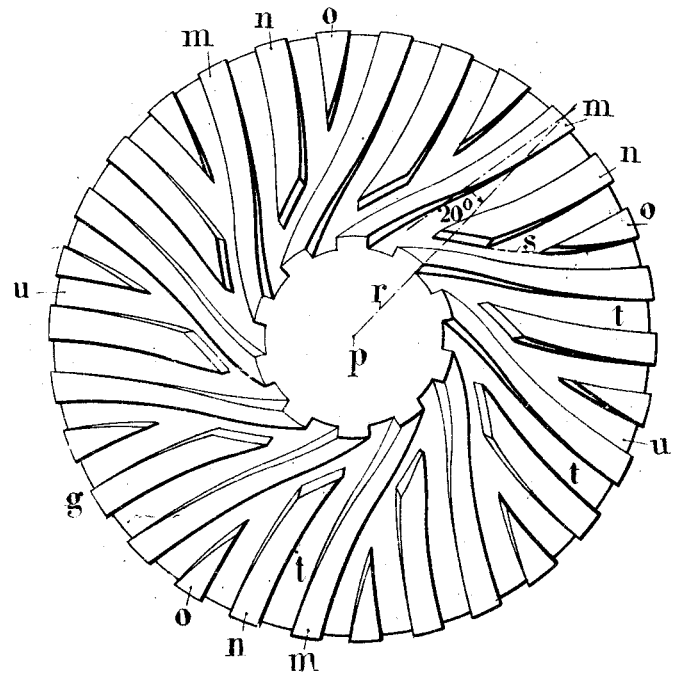
Figure 6:
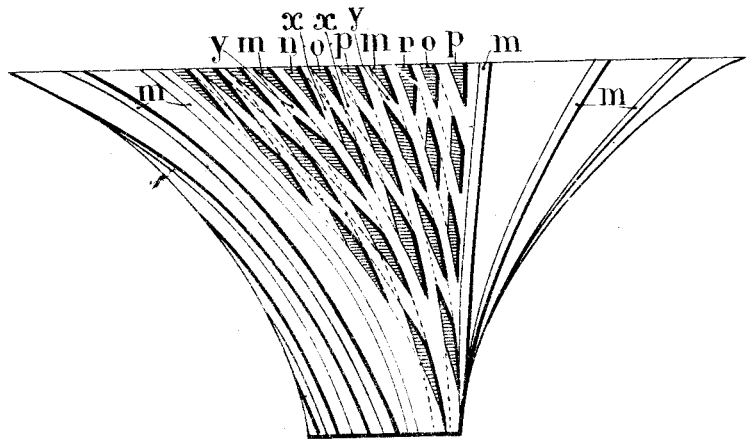
Figure 7:
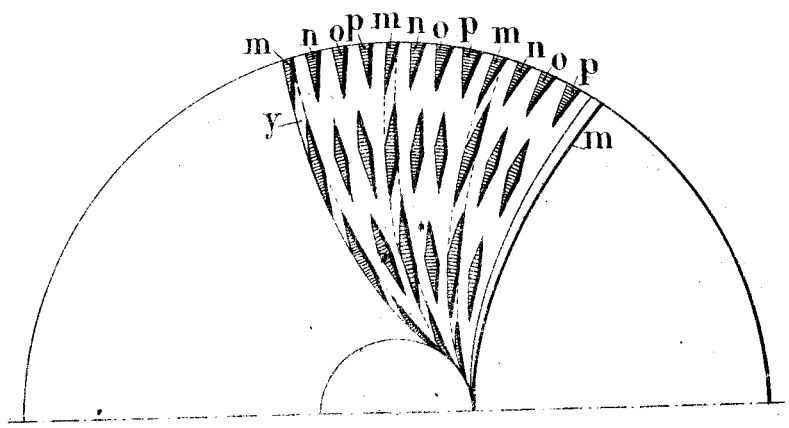
Figure 12:
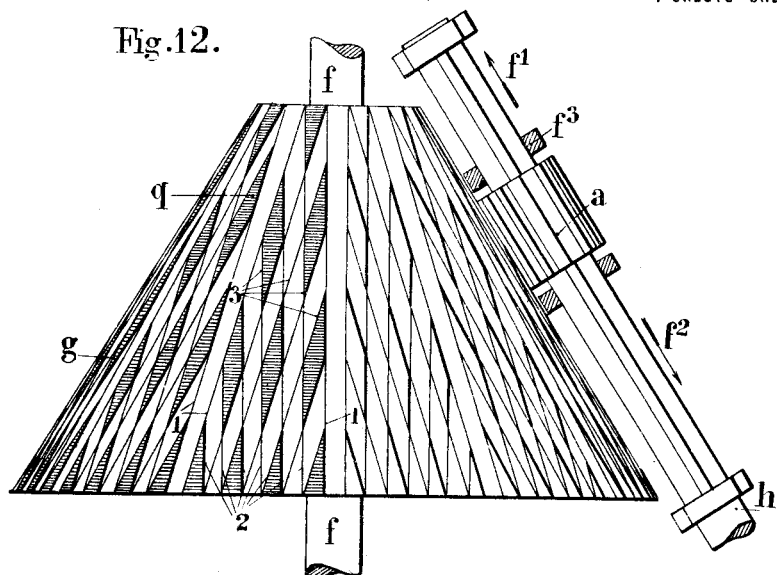
Figure 15:
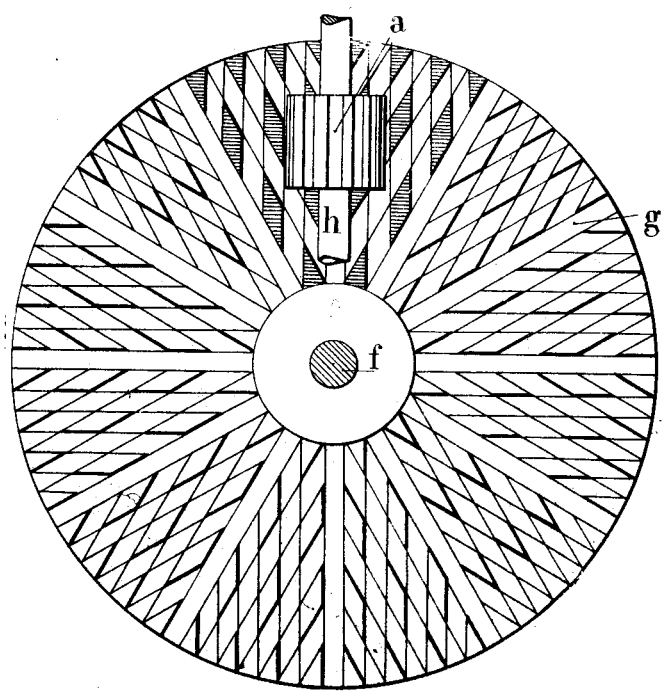
Figure 16:
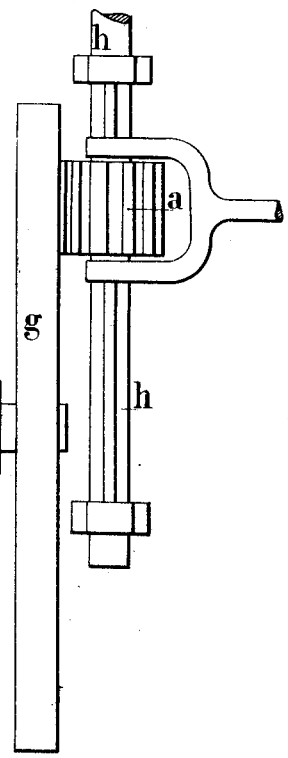
Figure 14:
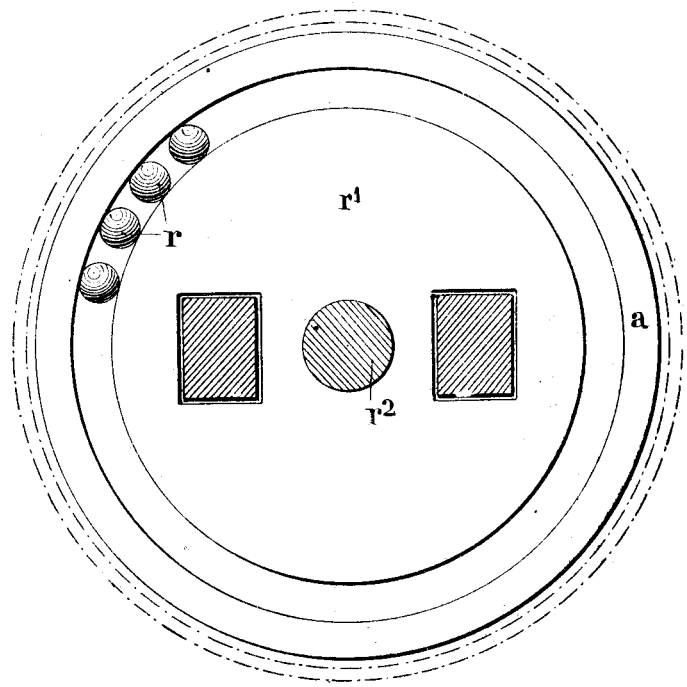

The invention is illustrated by way of example only in the accompanying drawings in which:

Figure 1 is a vertical section of one form of the improved change speed gearing; Fig. 2 is a section made on line A—A of Fig. 1; Fig. 3 is a similar section, showing a modification; Figs. 4 and 5 are respectively an elevation and an underside plan view of the pinion having a variable number of teeth; Figs. 6 and 7 illustrate respectively in elevation and underside plan view a pinion having lozenge shaped teeth; Fig. 8 illustrates the combination of two pinions having a variable number of teeth simultaneously gearing with a third toothed pinion; Fig. 9 is a section made on line B—B of Fig. 8; Figs. 10 and 11 are two diagrammatical views disclosing the operation of this latter arrangement; Fig. 12 shows in elevation a modification of the new change speed gear; Fig. 13 illustrates an application of the preceding arrangement; Fig. 14 is a section made on line C—C of Fig. 13; Figs. 15 and 16 on the one hand and Fig. 17 on the other hand relate to modifications.

As illustrated in the drawings (Fig. 1) a pinion, constituted by a toothed disk $a$ is mounted in a cup $b$ so as to be capable of rotating about its center and in its plane. The cup $b$ is provided with two trunnions $c\ c'$ the axis of which is at right angles to the axis of rotation of the disk $a$ and said trunnions can rotate in bearings $d\ d'$. A lever $e$ rigidly mounted on the trunnion $c$ allows of varying at will the inclination of the cup and, consequently, of the disk $a$. The operating shaft $f$ is arranged in the plane perpendicular to the axis of the trunnions $c\ c'$ and passing through the center of the disk $a$. On this shaft is rigidly mounted a toothed pinion $g$ gearing with the disk $a$ and the profile of which is a portion of a circumference having its center on the axis $o$ of the trunnions $c\ c'$. On the pinion $g$ are traced suitably inclined teeth. These teeth extend from the wide base of the pinion and a certain number of them end at greater or less distances from this base, so that, for instance, the pinion $g$ has a number of teeth three times greater at its widest base than at its narrowest part.

It will at once be understood that, according to the inclination given to the disk $a$, by means of the lever $e$, the latter gears with a part of the pinion having a more or less great diameter and, consequently, the disk $a$ receives, from the operating shaft $f$, a more or less rapid rotary movement.

The movement of the disk $a$ is imparted to the receiving shaft $h$ by means of a universal coupling. In the drawings this coupling is illustrated in the form of a ball and socket joint. The end $h'$ of the shaft $h$ is a sphere having its center on the axis of the trunnions $c$ $c'$ and on the axis of rotation of the disk $a$. Said sphere fits into a spherical recess provided in the disk $a$ so that the shaft is hinged on the disk by means of a kind of ball and socket joint. The sphere has a groove $i$ in which fit pins $j$ secured within the spherical recess of the disk $a$. These pins allow the disk $a$ to drive the sphere $h'$ while permitting the disk to take any inclination whatever relatively to the shaft $h$. Fig. 3 shows a modification of this connection device in which the ball is actuated by a pin $k$ of the disk $a$, which passes through a slot $l$ formed according to a diametrical plane of the sphere $h'$, as illustrated. The connection between the disk $a$ and the shaft $h$ could be also effected by providing the sphere $h'$ and its chamber in the disk $a$ with teeth similar to those of the pinion $g$ and so arranged as to insure the actuation of the shaft $h$ by means of the disk, while allowing the latter to incline in any direction whatever relatively to said shaft.

It is of course to be understood that the device can be reversed and that the shaft $h$ can be the driving shaft and the shaft $f$ the driven shaft.

The shape and the teeth of the pinion $g$ may vary according to the applications. Figs. 4 and 5 illustrate an arrangement of teeth which will be convenient for the majority of cases. The teeth of the pinion $g$ present a certain inclination relatively to the planes passing through the axis of rotation $p$. In the example illustrated, at each point of the edge of a tooth, the angle between the tangent to one edge and the tangent to the meridian line of the solid of revolution constituting the pinion is 20°. This angle may vary according to the sizes of the pinion $g$ and disk $a$, the maximum and minimum speeds, etc., in the various applications of the improved change speed gearing.

In the example illustrated in the drawings, the pinion comprises a series of teeth $m$, uniformly spaced apart, inclined at 20° in projection relatively to the radii $r$ of the circumference (Fig. 5). Between these teeth are arranged other teeth $n$ and $o$, parallel to the former; the ends of the teeth which are nearest the axis, are limited in projection by curves $s$, parallel to the following teeth $m$; the intervals $t$ are equal to the intervals $u$. According to circumstances, the teeth can be inclined in a reverse direction to that illustrated.

In the arrangement shown in Figs. 6 and 7, the main pinion is provided with teeth $m$ uniformly spaced apart and similarly inclined. Between said teeth are arranged teeth $n$ $o$ $p$, parallel to the former. The teeth $n$ $o$ $p$ are intersected by ways $x$ having a width equal to the interval between the teeth and parallel to the following teeth $m$, while the teeth $m$ are intersected by ways $y$ parallel to the preceding teeth $m$. It results therefrom that instead of presenting continuous teeth, the pinion has series of teeth having the shape of lozenges of different sizes, according to their location on the surface of the solid.

In the example shown in the drawings the lozenges of the edge are intersected by the plane which limits the solid of revolution, so that they are reduced to triangles. According to circumstances, said lozenges can remain entire. In any case, by means of this arrangement, whatever may be the respective positions of the pinion and of the disk in gear with the same, the teeth of the latter can always pass on the pinion, when the disk is moved for changing the speed. The inclination of the teeth may vary from 0 to 45°.

The arrangement illustrated in Figs. 8 to 11, while insuring the variation of the speed, according to the principle of the invention, presents this essential advantage that it allows to obtain very great gear ratios and speed reducing ratios.

As illustrated in Figs. 8 to 11, the transmission of movement from the driving shaft $f$ to the driven shaft $h$ is effected by means of two similar pinions $g$ $g'$ simultaneously gearing with a rotary toothed disk $a$. The two pinions $g$ and $g'$ are similar to the preceding pinion $g$, but the teeth are preferably formed as set forth with reference to Figs. 6 and 7.

$g'$ and $g''$ indicate pulleys rigidly mounted on the shafts of these pinions, but it is to be understood that the shafts $f$ and $h$ can be connected to the driving and driven members in any suitable manner. The profile of the pinions $g$ $g'$ consists in arcs of circles of the same radius and having as common center the point $o$. The disk $a$ is mounted on an axis $a'$ supported by a case (Fig. 9) that may be turned by means of a driving lever $e$. The three axes of the pinions $g$ $g'$ and of the disk $a$ are in the same plane. When the direction in which the disk $a$ is set is modified, it gears with a greater number of teeth on one of the pinions $g$ and $g'$ and less on the other. Assume the disk $a$ is in one of its extreme positions. In this position, when the pinion $g$ effects one revolution, the disk $a$ effects also one revolution. From the disk $a$ to the pinion $g'$ there is multiplication or increase of movement so that this pinion $g'$ makes $n$ number of revolutions.

Assume the disk $a$ has been brought to its other extreme position (Fig. 11). From the pinion $g$ to the disk $a$ there is a reduction of movement. For one revolution of $g$, the disk $a$ makes $\frac{1}{n}$ revolution. Concerning the pinion $g'$, it rotates, in this case, at the same speed as the disk $a$, that is to say it makes $\frac{1}{n}$ revolution. The gear ratio, obtained by the improved device, varies therefore from $n$ to $\frac{1}{n}$ revolution. The total variation is therefore equal to $n^2$. For instance, for one revolution of $g$, there is four revolutions of $g'$ or $\frac{1}{n}$ of revolution of $g'$. The total variation of gear ratio is therefore in the proportion of 1 to 16.

In the middle position illustrated in Fig. 8, the speed of $g'$ is equal to that of $g$. In the intermediate positions between the two extreme positions, the ratio of the speeds takes any value between 1 and $n^2$, that is 1 to 16 in the example given.

In the arrangement illustrated in Fig. 12, the improved change speed gearing comprises a bevel pinion $g$ and a spur pinion $a$ gearing the one with the other. The pinion $g$ is rigidly mounted on the driving shaft $f$; the pinion $a$ can slide along the driven shaft $h$; slots, and a long key, force the shaft $h$ to rotate with the pinion $a$. The pinion $a$ is an ordinary pinion, but the pinion $g$ is provided with lozenge shaped teeth $q$, obtained by tracing on the conical surface of the pinion generatrices 1, 1 uniformly distributed on said conical surface and lines 2, 2 parallel to the preceding generatrices and intersecting the same by lines 3, 3 parallel to the following generatrices.

It will be understood that if the pinion $a$ is moved in the direction of the arrow $f'$ by means of a fork $f^3$ or by any other suitable means, this pinion comes in contact with a smaller number of teeth of the pinion $g$ for one revolution of this pinion. The speed of the shaft $h$ is therefore decreased. Reversely, by moving the pinion $a$ in the direction of the arrow $f^2$, said pinion is brought in contact with the widest part of the pinion $g$; the speed is increased.

Fig. 13 shows an application of the invention. The device illustrated comprises two similar pinions $g$ and $g'$ symmetrically arranged and with which simultaneously gears a pinion $a$. This pinion is mounted, through the medium of a ball bearing $r$, on a disk $r'$ sliding on slides and capable of being moved parallelly to this axis of rotation of the pinion, by means of a screw $r^2$ controlled by pinions $z$ and $z'$. If the pinion $a$ is moved in the direction of the arrow $f'$, it comes in contact with the narrowest part of the pinion $g$ and the widest part of the pinion $g'$. This being the minimum speed. If said pinion is moved in the reverse direction, the maximum speed is obtained. In this example, there is a double speed reducing ratio or a double gear ratio. If the variation of speed produced by a pinion is from 1 to 4, the total variation is of 1 to 16. It will be noted that, in this arrangement, the transmission of movement is effected from a shaft $f$ to a shaft $h$ parallel to the former.

Figs. 15 and 16 illustrate a modification in which a plate the surface of which is a limit of the preceding cone is substituted for the pinion $g$. The teeth of this plate are obtained in the same way as previously (Fig. 12). This arrangement allows of the transmission of speed from a driving shaft $f$ to a driven shaft $h$ at right angles to the former.

Figure 17:
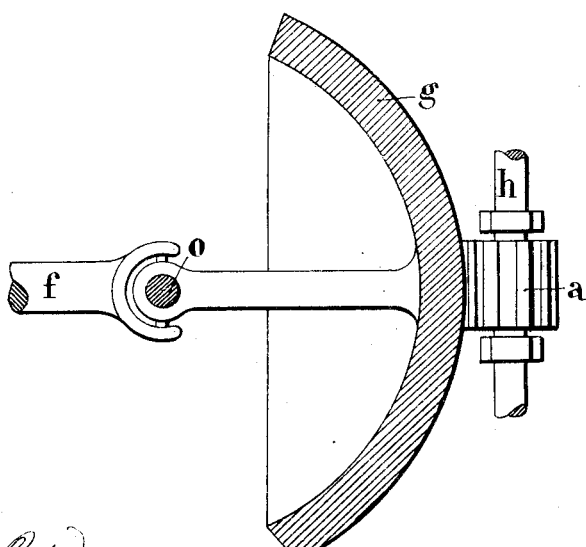

Fig. 17 relates to another modification in which one of the pinions is spherical; this pinion is mounted on a ball $o$ by means of which the direction in which it is set can be modified. It is therefore possible to bring in contact with the pinion $a$ a part of the sphere rotating at a greater or less speed.

The above arrangements are given only by way of examples; the forms, sizes and detail arrangements may be varied without modifying the principle of the invention.

Claims:

1. In a change speed gearing a pinion, provided with lozenge-shaped teeth the number of which decreases progressively from the part farthest from the axis of rotation to the part nearest said axis, a second pinion gearing with the first pinion, and means for moving the second pinion for putting it into gear with a part of the first pinion provided with a greater or lesser number of teeth.

2. In a change speed gearing, a pinion having lozenge-shaped teeth, a second pinion gearing with the first pinion, and means for moving the second pinion for putting it into gear with a part of the first pinion provided with a greater or lesser number of teeth.

3. In a change speed gearing, a conical gear, the teeth of which are lozenge-shaped and of different sizes, said teeth decreasing in number progressively from the larger to the smaller end thereof, a pinion gearing with the said gear, and means for moving the pinion relatively to said conical gear 4. In a change speed gear, a conical gear, the teeth of which decrease in number progressively from the larger to the smaller end thereof, a rocking support, and a pinion mounted in the support and meshing with the said conical gear.

5. In a change speed gearing, a conical gear, the teeth of which decrease in number progressively from the larger to the smaller end thereof, a rocking support, and a pinion mounted in the support with its axis of rotation at right angles to the axis about which the support rocks, said pinion meshing with the said conical gear.

6. In a change speed gearing, a conical gear, the teeth of which are lozenge-shaped and decrease in number progressively from the larger to the smaller end thereof, a rocking support, and a pinion mounted in the support with its axis of rotation at right angles to the axis about which the support rocks, the said pinion meshing with the said conical gear.

The foregoing specification of my continuous and progressive change speed gear signed by me this 31st day of October 1912.

PIERRE MARCELLOT.

Witnesses:
 HANSON C. COXE,
 R. THIRIOT.